United States Patent
Pittman

(10) Patent No.: US 7,526,558 B1
(45) Date of Patent: Apr. 28, 2009

(54) SYSTEM AND METHOD FOR SUPPORTING A PLURALITY OF LEVELS OF ACCELERATION IN A SINGLE PROTOCOL SESSION

(75) Inventor: Joseph C. Pittman, Apex, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 599 days.

(21) Appl. No.: 11/273,114

(22) Filed: Nov. 14, 2005

(51) Int. Cl.
  *G06F 15/173* (2006.01)
(52) U.S. Cl. .................. 709/227; 709/235; 370/469
(58) Field of Classification Search ......... 709/230–241, 709/227–228; 370/469
See application file for complete search history.

(56) References Cited

U.S. PATENT DOCUMENTS

| | | | |
|---|---|---|---|
| 6,760,304 B2 | 7/2004 | Uzrad-Nali et al. | |
| 2003/0046414 A1* | 3/2003 | Pettyjohn et al. | ............. 709/230 |
| 2003/0115350 A1 | 6/2003 | Uzrad-Nali et al. | |
| 2003/0189896 A1* | 10/2003 | Dang et al. | .................. 370/217 |
| 2004/0064815 A1 | 4/2004 | Uzrad-Nali et al. | |
| 2004/0139167 A1 | 7/2004 | Edsall et al. | |
| 2004/0156393 A1 | 8/2004 | Gupta et al. | |
| 2004/0268017 A1 | 12/2004 | Uzrad-Nali et al. | |
| 2007/0174479 A1* | 7/2007 | Sperry et al. | ................. 709/233 |

\* cited by examiner

*Primary Examiner*—Salad Abdullahi
(74) *Attorney, Agent, or Firm*—Cesari and McKenna, LLP

(57) ABSTRACT

A system and method supports a plurality of levels of acceleration in an iSCSI session between a client and a storage system. The iSCSI session includes multiple connections and the levels of acceleration include different types of transport provider hardware. An iSCSI session manager is configured to manage a different type of transport provider hardware over one or more connections of the session. The use of a multi-connection session with differing levels of acceleration enables the client to use standard multi-pathing algorithms, such as active/passive and/or weighted path selection, to maximize performance by employing the highest accelerated connection as a preferred data pathway.

17 Claims, 4 Drawing Sheets

SYSTEM AND METHOD FOR SUPPORTING A PLURALITY OF LEVELS OF ACCELERATION IN A SINGLE PROTOCOL SESSION

FIELD OF THE INVENTION

The present invention relates to storage systems and, more specifically, to enabling the use of multiple levels of acceleration in a single protocol session between a client and a storage system.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The storage system may be further configured to operate according to a client/server model of information delivery to thereby allow many client computers (clients) to access shared resources, such as files, stored on the storage system. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the storage system by exchanging discrete packets or messages of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. Resources of the storage system that enable such connection with the client include a network protocol stack. The network protocol stack comprises layers of software, such as a session layer, a transport layer and a network layer. IP protocol is a network layer protocol that provides network addressing between computers, such as the client and storage system, whereas TCP is a transport layer protocol that creates a connection between processes of the computers that indicate a willingness to communicate.

Broadly stated, the connection provided by a transport layer, such as TCP, is a reliable, securable logical circuit between pairs of processes. A TCP process executing on the computers establishes the TCP connection in accordance with a conventional "3-way handshake" arrangement involving the exchange of TCP message or segment data structures. The resulting TCP connection is identified by port numbers and IP addresses of the computers. The TCP transport service provides reliable delivery of a message using a TCP transport header. The TCP protocol and establishment of a TCP connection are described in *Computer Networks, 3rd Edition*, particularly at pgs. 521-542, which is hereby incorporated by reference as though fully set forth herein.

The session layer manages the establishment or binding of an association between two communicating processes in the computers. In this context, the association is a session comprising a series of interactions between the two communicating processes for a period of time, e.g., during the span of a connection. Upon establishment of the connection, the processes take turn exchanging commands and data over the session, typically through the use of request and response messages in accordance with a pre-defined protocol.

NAS systems generally utilize file-based access protocols; therefore, each client may request the services of the storage system by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not over-write data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage appliance is the Write Anywhere File Layout (WAFL®) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system, residing on a storage system that processes file-service requests from network-attached clients.

As used herein, the term "storage operating system" generally refers to the computer-executable code operable on a storage system that manages data access and may, in case of a filer, implement file system semantics, such as the Data ONTAP™ storage operating system. The storage operating system can also be implemented as an application program operating over a general-purpose operating system, such as UNIX® or Windows XP®, or as a general-purpose operating system with configurable functionality, which is configured for storage applications as described herein.

Disk storage is typically implemented as one or more storage "volumes" that comprise physical storage disks, defining an overall logical arrangement of storage space. Currently available storage system implementations can serve a large number of discrete volumes. Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of parity information with respect to the striped data. In the example of a WAFL-based file system, a RAID 4 implementation is advantageously employed. This implementation specifically entails the striping of data across a group of disks, and separate parity storing within a selected disk of the RAID group. As described herein, a volume typically comprises at least one data disk and one associated parity disk (or possibly data/parity partitions in a single disk) arranged according to a RAID 4, or equivalent high-reliability, implementation.

Clients of a storage system utilizing the iSCSI protocol (SCSI encapsulated in TCP/IP) may desire to utilize a plurality of connections within a single iSCSI session with the system as defined in Request For Comments (RFC) 3720, entitled *Internet Small Computer Systems Interface (iSCSI)*, dated April 2004, the contents of which are hereby incorporated by reference. According to the iSCSI protocol, an iSCSI session comprises one or more TCP connections that link an initiator to a target. An initiator may utilize any of the TCP connections within the session for transmitting data access operations to the target. Moreover, each TCP connection may use different initiator-side and/or client-side network interfaces. Thus, an initiator and/or target may take advantage of multiple distinct data paths within the iSCSI session, thereby improving availability and/or enabling bandwidth aggregation.

Each client typically utilizes a transport provider driver as an iSCSI session manager, wherein each iSCSI session is typically associated with exactly one transport provider driver. As such, all of the transport provider hardware that may be utilized for a single iSCSI session is managed by a single iSCSI session manager. Examples of trans-port provider hardware (and corresponding drivers) include network interface controllers (NICs), TCP/IP offload engines (TOEs) and iSCSI host bus adapters (HBAs). In known iSCSI systems, initiators and targets associate one iSCSI session manager for each type of transport provider hardware utilized. For example, a first iSCSI session manager may be associated with all NICs, a second iSCSI session manager may be associated with any TOEs and a third iSCSI session manager may be associated with any iSCSI HBAs.

In such iSCSI systems, however, an iSCSI session is prevented from spanning connections having differing characteristics, such as different levels of acceleration. As used herein, the term "different levels of acceleration" denotes different types of transport provider hardware, software and firmware (or combinations thereof) that utilize differing models of operation to perform their tasks. Initiators may open multiple sessions, each of which may use one of the levels of acceleration and/or data transmission speeds; yet, a noted disadvantage of such an arrangement involves additional complications that arise due to the need to manage multiple sessions and the use of a plurality of iSCSI session managers.

SUMMARY OF THE INVENTION

The present invention overcomes the disadvantages of the prior art by providing a system and method for supporting a plurality of levels of acceleration in an iSCSI session between a client and a storage system. The iSCSI session includes multiple connections and the levels of acceleration include different types of transport provider hardware. According to the present invention, a novel iSCSI session manager is configured to manage a different type of transport provider hardware over one or more connections of the session. The use of a multi-connection session with differing levels of acceleration enables the client to perform multi-path operations, including active/passive and/or weighted path selection, by employing the highest accelerated connection available as a preferred data pathway.

In the illustrative embodiment, the iSCSI session manager is embodied as an iSCSI module of a storage operating system executing on the storage system. The storage system is illustratively embodied as a storage appliance having features such as simplicity of storage service management and ease of storage reconfiguration for clients of network attached storage and storage area network deployments. In addition, the different types of transport provider hardware illustratively include, for example, network interface controllers (NICs) of varying data transmission speeds, TCP/IP offload engines (TOEs), and iSCSI host bus adapters (HBAs).

Operationally, a client (initiator) initially creates a session with the storage appliance using a connection associated with a first level of acceleration. The initiator may subsequently establish (open) additional connections in the session and associate those connections with differing levels of acceleration. The initiator may then utilize the various connections with the storage appliance in accordance with multi-pathing techniques. For example, the initiator may utilize the connection having the highest level of acceleration as the preferred data pathway for all data access operations served by the appliance. If that connection becomes overloaded (and/or fails), the initiator may utilize another connection (e.g., having the next highest level of acceleration) in the session as the data pathway for the operations.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage Appliance

When used in a storage area network (SAN) and/or network attached storage (NAS) environment, a storage system may be embodied as a storage appliance having features such as simplicity of storage service management and ease of storage reconfiguration, including reusable storage space, for users (system administrators) and clients of NAS and SAN deployments. The storage appliance includes a storage operating system that implements a file system that is further configured to provide storage virtualization and support for virtual disks (vdisks). An example of a storage appliance that may be advantageously used with the present invention is described in U.S. patent application Ser. No. 10/215,917 entitled A MULTI-PROTOCOL STORAGE APPLIANCE THAT PROVIDES INTEGRATED SUPPORT FOR FILE AND BLOCK ACCESS PROTOCOLS, by Brian Pawlowski, et al.

Figure 1:
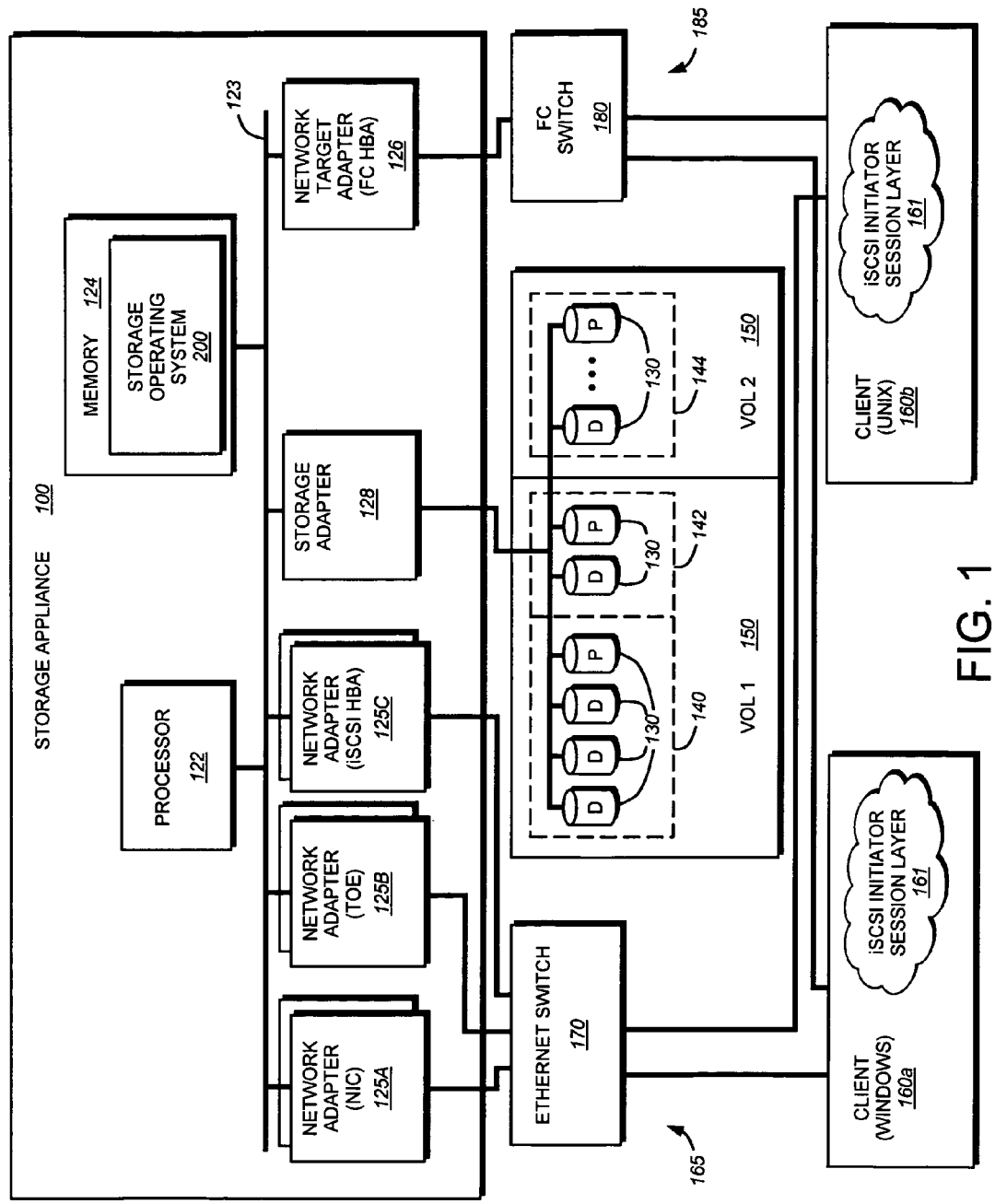
FIG. 1 is a schematic block diagram of an exemplary storage system network in accordance with an embodiment of the present invention.

FIG. 1 is a schematic block diagram of an illustrative storage appliance 100 that may be advantageously used with the present invention. The storage appliance 100 is configured to provide storage service for both file and block protocol access to information stored on storage devices, such as disks 130, in an integrated manner. The storage appliance 100 comprises a processor 122, a memory 124, a plurality of network adapters 125A, B, C, 126 and a storage adapter 128 interconnected by a system bus 123. The storage appliance 100 also includes a storage operating system 200 that provides a virtualization system (and, in particular, a file system) to logically organize the information as a hierarchical structure of named directory, file and vdisk storage objects on the disks 130.

The clients of a SAN-based network environment have a storage viewpoint of blocks or disks. To that end, the multi-protocol storage appliance 100 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports, as described further herein.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which is typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the invention described herein.

The network adapters 125 couple the storage appliance to a plurality of clients 160a,b over point-to-point links, wide area networks, virtual private networks implemented over a public network (Internet) or a shared local area network, hereinafter referred to as an illustrative Ethernet network 165. For this NAS-based network environment, the clients are configured to access information stored on the storage appliance as files. Therefore, the network adapter 125A may comprise a network interface controller (NIC) having the mechanical, electrical and signaling circuitry needed to connect the appliance to a network switch, such as a Ethernet switch 170. In an illustrative embodiment, there may be a plurality of NICs 125A with varying data transmission speeds. For example, a first NIC 125A may comprise a 1 gigabit Ethernet controller, a second NIC 125A may comprise a 10 gigabit Ethernet controller, etc. Network adapters 125 having various levels of acceleration may also be included. One example is a Transmission Control Protocol/Internet Protocol (TCP/IP) Offload Engine (TOE) 125B that performs TCP/IP processing of packets without involvement of the processor 122. Such a TOE 125B may include one or more processors or other computational hardware and/or firmware for performing TCP/IP processing separate from the storage appliance's processor 122. Another accelerated network adapter may comprise an iSCSI host bus adapter (HBA) 125C, which performs TCP/IP, and some portion of iSCSI, processing of packets without involving the processor 122, or storage operating system 200.

The clients 160 communicate with the storage appliance 100 over network 165 by exchanging discrete frames or packets of data according to pre-defined protocols, such as TCP/IP. The clients 160 may be general-purpose computers configured to execute applications over a variety of operating systems, including the UNIX® and Microsoft® Windows™ operating systems. Client systems generally utilize file-based access protocols when accessing information (in the form of files and directories) over an NAS-based network. Therefore, each client 160 may request the services of the storage appliance 100 by issuing file access protocol messages (in the form of packets) to the appliance over the network 165. For example, a client 160a running the Windows operating system may communicate with the storage appliance 100 using the Common Internet File System (CIFS) protocol over TCP/IP. On the other hand, a client 160b running the UNIX operating system may communicate with the appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the storage appliance using other file access protocols.

The storage network "target" adapter 126 also couples the storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a FC switch 180. In addition to providing FC access, the FC HBA may offload FC network processing operations for the storage appliance.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The storage appliance 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI messages over IP network 165 and/or FCP messages over Fibre Channel network 185 to access information stored on the disks. It will be apparent to those skilled in the art that the clients may also request the services of the integrated multi-protocol storage appliance using other block access protocols. By supporting a plurality of block access protocols, the storage appliance provides a unified and coherent access solution to vdisks/luns in a heterogeneous SAN environment.

The storage adapter 128 cooperates with the storage operating system 200 executing on the storage appliance to access information requested by the clients. The information may be stored on the disks 130 or other similar media adapted to store information. The storage adapter includes I/O interface circuitry that couples to the disks over an I/O interconnect arrangement, such as a high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. However, other RAID level configurations (e.g. RAID 5) are also contemplated. In the illustrative embodiment, a minimum of one parity disk and one data disk may be employed. However, a typical implementation may include three data and one parity disk per RAID group and at least one RAID group per volume.

One or more vdisks may be stored within each volume. A vdisk is a special file type in a volume that derives from a plain (regular) file, but that has associated export controls and operation restrictions that support emulation of a disk. In the illustrative embodiment, a vdisk is a multi-inode object comprising a special file inode and a set of stream inodes that are managed as a single, encapsulated storage object within the file system of the storage system. As used herein, a set of stream inodes denotes one or more stream inodes. The vdisk illustratively manifests as an embodiment of a stream inode that, in cooperation with the special file inode, creates a new type of file storage object having the capacity to encapsulate specific security, management and addressing (export) information. A vdisk is, thus, an encapsulated data container comprising a data section and one or more metadata sections that may be stored in streams associated with the data section within the file system. An example of a stream inode object that may be advantageously used with the present invention is described in U.S. Pat. No. 6,643,654 titled SYSTEM AND METHOD FOR REPRESENTING NAMED DATA STREAMS WITHIN AN ON-DISK STRUCTURE OF A FILE SYSTEM, by Kayuri Patel et al., which is hereby incorporated by reference as though fully set forth herein.

B. Storage Operating System

To facilitate access to the disks 130, the storage operating system 200 implements a write-anywhere file system that cooperates with virtualization modules to provide a function that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP™ operating system available from Network Appliance, Inc., Sunnyvale, Calif. that implements a Write Anywhere File Layout (WAFL®) file system. However, it is expressly contemplated that any appropriate storage operating system, including a write in-place file system, may be enhanced for use in accordance with the inventive principles described herein. As such, where the term "WAFL" is employed, it should be taken broadly to refer to any file system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
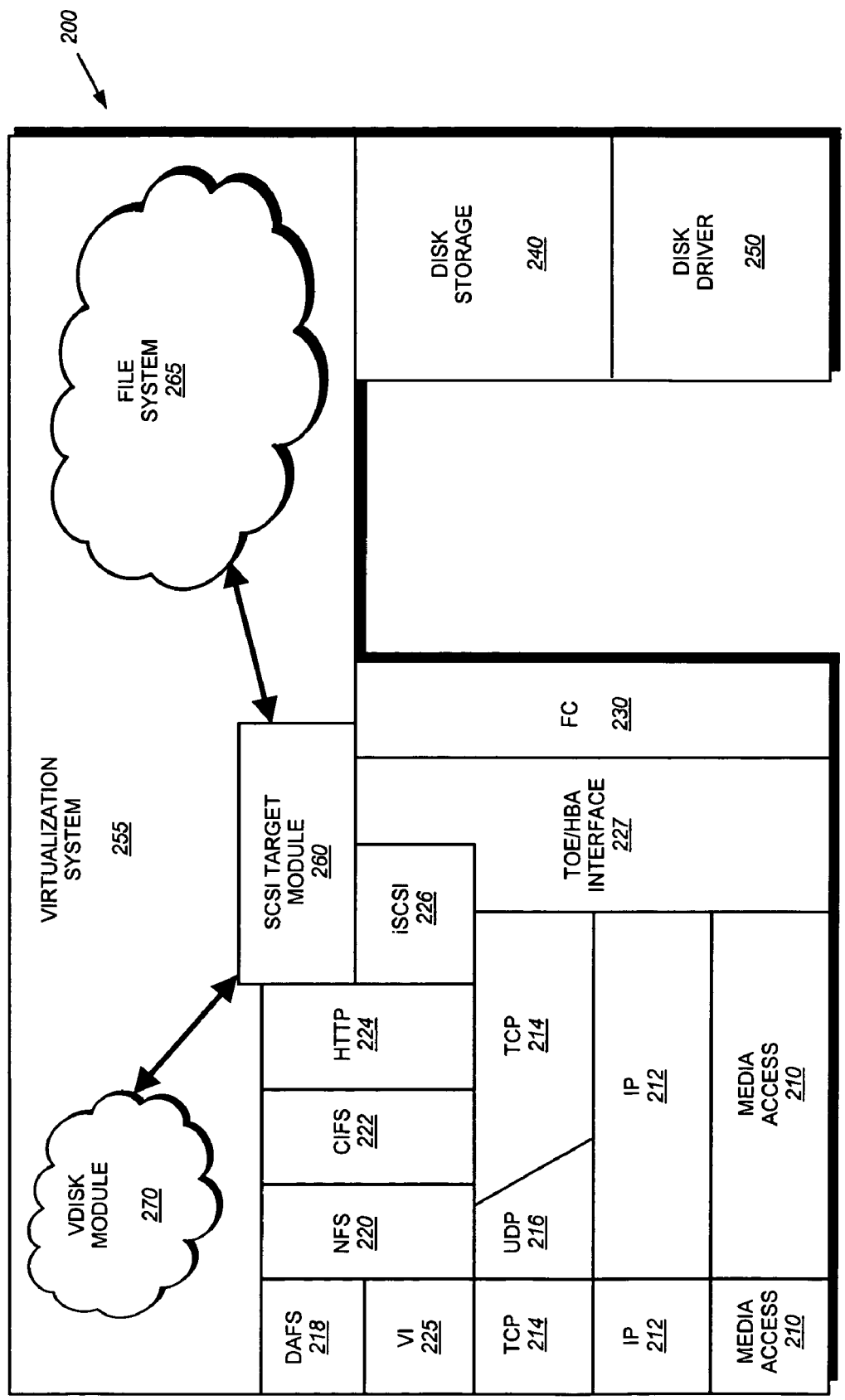
FIG. 2 is a schematic block diagram of an exemplary storage operating system in accordance with an embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 225 implements the VI architecture to provide direct access transport (DAT) capabilities, such as RDMA, as required by the DAFS protocol 218.

A TCP Offload Engine (TOE)/Host Bus Adapter (HBA) interface module 227 is illustratively disposed between TOEs/HBAs 125B,C and the iSCSI module 226. TOEs 125B are configured to process the TCP/IP portions of packets received at the protocol stack, whereas iSCSI HBAs 125C may also be configured to perform some or all of the processing normally performed by the iSCSI module 226. The TOE/HBA interface module 227 interfaces with the TOE/HBA to perform such functions as tracking memory buffers utilized between the TOE/HBA and the storage operating system, maintaining data structures for sessions/connections, etc.

The iSCSI module 226 provides block protocol access over the TCP/IP network protocol layers and the TOE/HBA interface module 227, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the storage appliance. In addition, the storage operating system includes a disk storage layer 240 that implements a disk storage protocol, such as a RAID protocol, and a disk driver layer 250 that implements a disk access protocol such as, e.g., a SCSI protocol.

Bridging the disk software layers with the integrated network protocol stack layers is a virtualization system 255 that is implemented by a file system 265 interacting with virtualization modules illustratively embodied as, e.g., vdisk module 270 and SCSI target module 260. It should be noted that the vdisk module 270, the file system 265 and SCSI target module 260 can be implemented in software, hardware, firmware, or a combination thereof. The vdisk module 270 interacts with the file system 265 to enable access by administrative interfaces in response to a system administrator issuing commands to the storage appliance 100. In essence, the vdisk module 270 manages SAN deployments by, among other things, implementing a comprehensive set of vdisk (lun) commands issued through a user interface by a system administrator. These vdisk commands are converted to primitive file system operations ("primitives") that interact with the file system 265 and the SCSI target module 260 to implement the vdisks.

The SCSI target module 260, in turn, initiates emulation of a disk or lun by providing a mapping procedure that translates luns into the special vdisk file types. The SCSI target module is illustratively disposed between the FC and iSCSI drivers 230, 226 and the file system 265 to thereby provide a translation layer of the virtualization system 255 between the SAN block (lun) space and the file system space, where luns are represented as vdisks. By "disposing" SAN virtualization over the file system 265, the multi-protocol storage appliance reverses the approaches taken by prior systems to thereby provide a single unified storage platform for essentially all storage access protocols.

The file system 265 is illustratively a message-based system; as such, the SCSI target module 260 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 260 passes the message into the file system 265 as, e.g., a function call, where the operation is performed.

The file system 265 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in the above-incorporated U.S. Pat. No. 5,819,292.

SAN clients typically identify and address disks by logical numbers or luns. However, the storage virtualization system allows system administrators to manage vdisks and their addressing by logical names. To that end, the vdisk module 270 of the multi-protocol storage appliance maps logical names to vdisks. For example when creating a vdisk, the system administrator "right size" allocates the vdisk and assigns it a name that is generally meaningful to its intended application (e.g., /vol/vol0/database to hold a database).

The storage virtualization system addresses the issue of performance limitations by defining a vdisk abstraction of a disk "on top of" the file system. This abstraction aggregates the bandwidth of the underlying disks by providing greater bandwidth for the vdisk than that obtainable by the concatenation of a smaller number of disk drives needed solely to satisfy space requirements. Additionally, delayed allocation policies and write coalescing of the file system can serve to optimize the bandwidth of the vdisk compared to a pure physical implementation. As noted, layering of the vdisk on top of the file system also allows the vdisk to inherit the reliability configuration (e.g., RAID 4 and/or synchronous mirroring) of the underlying volume.

C. Multiple Level of Acceleration in a Single iSCSI Session

Figure 3:
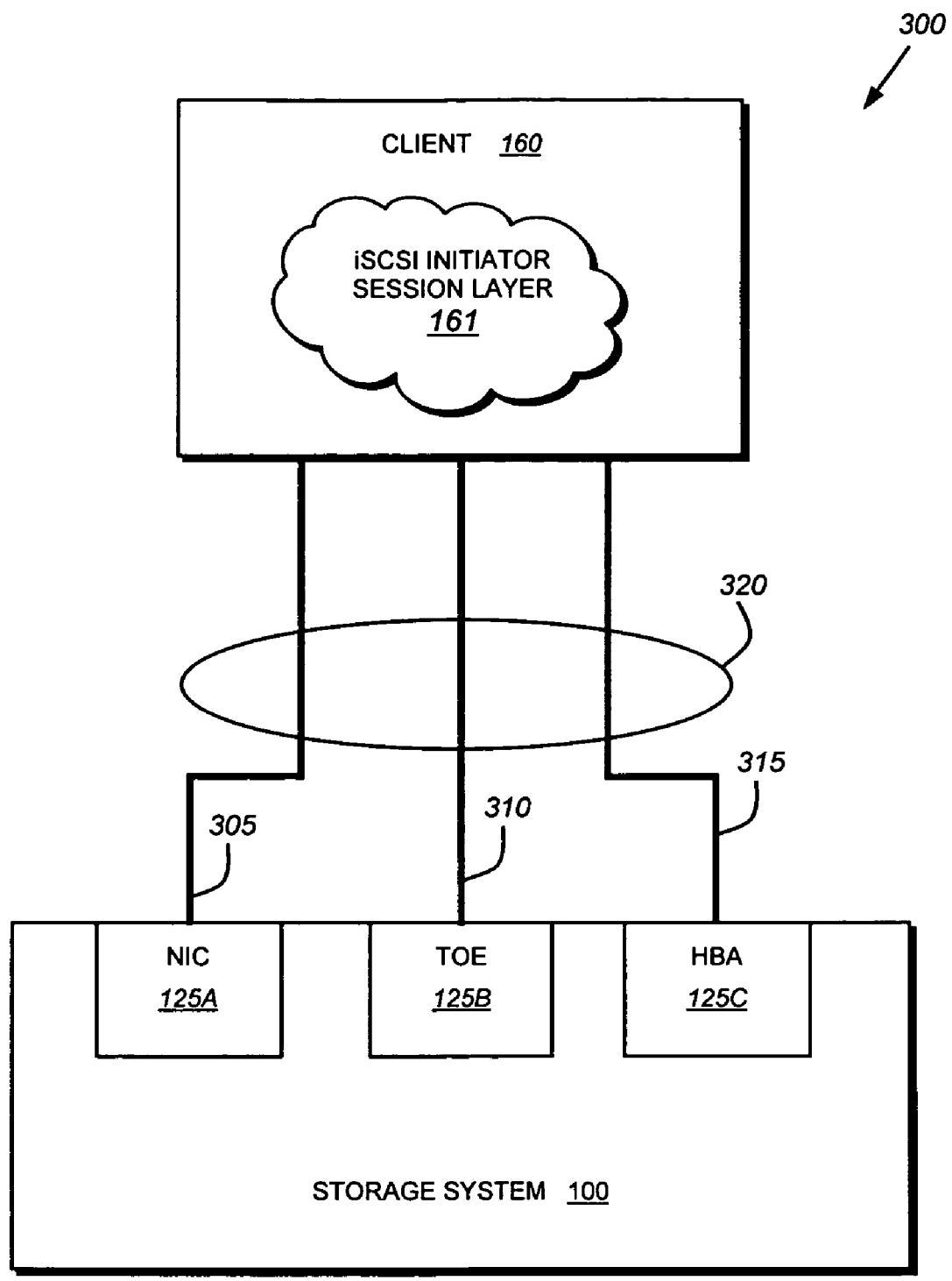
FIG. 3 is a schematic block diagram of an exemplary storage system environment illustrating a single session having a plurality of connections that supports a plurality of levels of acceleration in accordance with an embodiment of the present invention.

The present invention is directed to a system and method for supporting a plurality of levels of acceleration in an iSCSI session between a client and a storage system. The iSCSI session includes multiple connections and the levels of acceleration include different types of transport provider hardware. FIG. 3 is a schematic block diagram of an exemplary storage system environment 300 illustrating a single iSCSI session having a plurality of connections that supports a plurality of levels of acceleration in accordance with an embodiment of the present invention. Client 160 is connected to storage system 100 via a plurality of differing types of transport provider hardware, each of which has a different level of acceleration and/or data transmission speed. Examples of the transport provider hardware illustratively include NIC 125A, TOE 125B and iSCSI HBA 125C. It should be noted that environment 300 is illustrative only and that any combination of NICS, TOEs and HBAs (or other interfaces having differing levels of acceleration) may be utilized.

According to the present invention, a novel iSCSI session manager is configured to manage a different type of transport provider hardware over one or more connections of the session. The iSCSI session manager is illustratively embodied in iSCSI module 226 of storage operating system 200. The client illustratively connects to NIC 125A via connection 305, to TOE 125B via connection 310 and to HBA 125C via connection 315. In addition, the client 160 includes an iSCSI initiator session layer 161 that utilizes all of the connections 305, 310, 315 within a single iSCSI session 320. In this exemplary embodiment, the use of a multi-connection session, i.e., a session having three connections 305, 310, 315, with differing levels of acceleration within a single iSCSI session enables the iSCSI initiator layer 161 of the client to select the connection to be used for a SCSI request according to any multi-pathing technique and/or algorithm, including active/passive and/or weighted path selection, by employing the highest accelerated connection available as a preferred data pathway.

Operationally, a client (initiator) 160 initially creates a session 320 with the storage system (appliance) 100 using a connection associated with a first level of acceleration. The initiator may subsequently establish (open) additional connections, over data paths with different levels of acceleration, and associate those connections with the existing session. The initiator may then utilize the various connections with the storage appliance in accordance with multi-pathing techniques. For example, the initiator may utilize the connection having the highest level of acceleration as the preferred data pathway for all data access operations served by the appliance. If that connection becomes over-loaded (and/or fails), the initiator may utilize another connection (e.g., having the next highest level of acceleration) in the session as the data pathway for the operations.

For example, the iSCSI initiator layer 161 may utilize an active/passive technique wherein all data access operations are sent over pathway 315 to the HBA 125C. Should the pathway 315 become overloaded and/or inoperative, then the iSCSI initiator layer 161 attempts to utilize another of the data pathways. Alternately, the iSCSI initiator layer 161 may utilize a weighted average technique wherein, for example, 80% of data access operations are sent via data pathway 315 to the HBA 125C, 15% are sent via data pathway 310 to the TOE 125B and the remaining 5% are sent via data pathway 305 to the NIC 125B. It should be noted that these techniques are illustrative and that the novel iSCSI session manager may perform path selection using any acceptable multi-pathing technique and/or algorithm.

Figure 4:
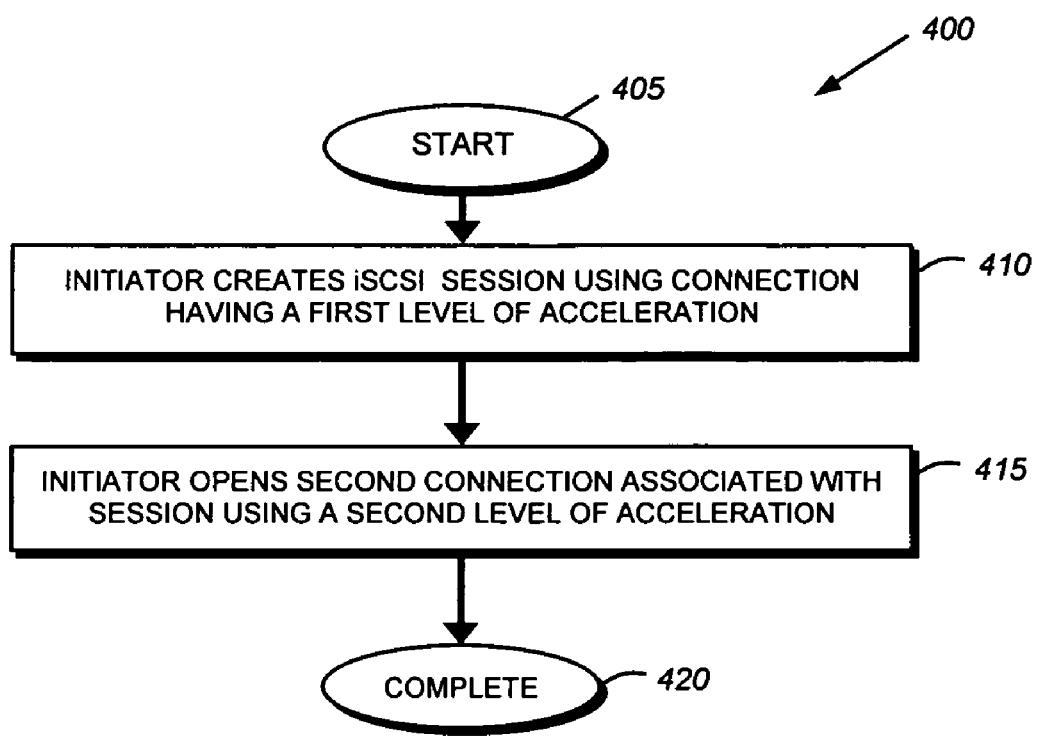
FIG. 4 is a flowchart detailing the steps of a procedure for initiating a session having connections associated with a plurality of different levels of acceleration in accordance with an embodiment of the present invention.

FIG. 4 is a flowchart detailing the steps of a procedure 400 for creating a session utilizing connections having differing levels of acceleration in accordance with an embodiment of the present invention. The procedure 400 begins in step 405 and continues to step 410 where an initiator (such as client 160) creates an iSCSI session with a target (such as storage system 100) using a connection having a first level of acceleration. Illustratively, this level of acceleration may either be a particular wire speed such as 1 GB Ethernet, 10 GB Ethernet, etc. or may represent a differing level of hardware acceleration such as a NIC, a TOE and/or an iSCSI HBA. Note that session creation and initialization are performed in accordance with the above-referenced iSCSI protocol. As a result of step 410, the iSCSI session includes a single connection between the initiator and the target.

In step 415, the initiator then opens a second connection associated with the session using a second (differing) level of acceleration. At this point, the session comprises two connections, each of which utilizes a differing level of acceleration. Communication between the initiator and target thus occurs over connections having differing levels of acceleration within a single session. In alternate embodiments, additional connections may be created, each with a differing level of acceleration, depending upon the particular network configuration topology of the storage system environment. As will be appreciated by one skilled in the art, the initiator may continue opening other connections having differing levels of acceleration or may open a plurality of connections having the same level of acceleration before opening one using a differing level of acceleration. Thus, for example, the initiator could open a plurality of connections using NICs before opening a connection using an iSCSI HBA within the same session. The procedure then completes in step 420.

It should be noted that, while the present invention has been described in terms of TCP connections being associated with iSCSI sessions, the teachings of the present invention may be utilized with any protocol session and/or transport protocol. Thus, for example, the present invention should not be read to be limited to utilizing TCP connections within iSCSI sessions.

The foregoing has been a detailed description of the illustrative embodiment of the present invention. Modifications and additions can be made without departing from the spirit and scope of the invention. Additionally, while this description has been written with reference to storage appliances and file servers, the principles are equally pertinent to all types of computers. Furthermore, it is expressly contemplated that the teachings of this invention can be implemented as software, including a computer-readable media having program instructions executing on a computer, hardware, firmware, or a combination thereof. Accordingly this description is to be taken only by way of example and not to otherwise limit the scope of the invention.

What is claimed is:

1. A method for providing a plurality of levels of acceleration within a protocol session between a client and a server, the method comprising:

creating the protocol session between the client and the server using a first connection having a first type of transport provider hardware, the first transport provider hardware associated with a first level of acceleration;

creating a second connection having a second type of transport provider hardware, the second transport provider hardware associated with a second level of acceleration; and utilizing the first connection and the second connection within the same protocol session to allow an initiator layer on a client to select the connection to be used for a request based the required level of acceleration without having to generate a new protocol session between the client and the server.

2. The method of claim 1 wherein the protocol session comprises an iSCSI session.

3. The method of claim 1 wherein the first level of acceleration is associated with a network interface controller.

4. The method of claim 1 wherein the first level of acceleration is associated with a TCP offload engine (TOE).

5. The method of claim 1 wherein the first level of acceleration is associated with a host bus adapter (HBA).

6. The method of claim 1 further comprising:
utilizing a multi-pathing algorithm to transmit operations over the first and second connections.

7. The method of claim 6 wherein the multi-pathing algorithm comprises an active/passive algorithm.

8. The method of claim 6 wherein the multi-pathing algorithm comprises a weighted average algorithm.

9. A system for providing a plurality of levels of acceleration within a protocol session between a client and a server, the system comprising:
means for creating the protocol session between the client and the server using a first connection having a first type of transport provider hardware, the first transport provider hardware associated with a first level of acceleration;
means for creating a second connection having a second type of transport provider hardware, the second transport provider hardware associated with a second level of acceleration; and
means for utilizing the first connection and the second connection within the same protocol session to allow an initiator layer on a client to select the connection to be used for a request based the required level of acceleration without having to generate a new protocol session between the client and the server.

10. The system of claim 9 wherein the protocol session comprises an iSCSI session.

11. The system of claim 9 wherein the first level of acceleration is associated with a network interface controller.

12. The system of claim 9 wherein the first level of acceleration is associated with a TCP offload engine (TOE).

13. The system of claim 9 wherein the first level of acceleration is associated with a host bus adapter (HBA).

14. The system of claim 9 further comprising:
means for utilizing a multi-pathing algorithm to transmit operations over the first and second connections.

15. The system of claim 14 wherein the multi-pathing algorithm comprises an active/passive algorithm.

16. The system of claim 14 wherein the multi-pathing algorithm comprises a weighted average algorithm.

17. A computer readable medium for providing a plurality of levels of acceleration within a protocol session, the computer readable medium including program instructions for performing the steps of:
creating the protocol session using a first connection having a first level of acceleration type of transport provider hardware, the first transport provider hardware associated with a first level of acceleration;
creating a second connection having a second type of transport provider hardware, the second transport provider hardware associated with a second level of acceleration; and
utilizing the first connection and the second connection within the same protocol session to allow an initiator layer on a client to select the connection to be used for a request based the required level of acceleration without having to generate a new protocol session.

* * * * *